United States Patent
Takata

(10) Patent No.: US 11,400,991 B2
(45) Date of Patent: Aug. 2, 2022

(54) VEHICLE

(71) Applicant: YAMAHA HATSUDOKI KABUSHIKI KAISHA, Iwata (JP)

(72) Inventor: Kazunari Takata, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 347 days.

(21) Appl. No.: 16/402,353

(22) Filed: May 3, 2019

(65) Prior Publication Data
US 2019/0389525 A1    Dec. 26, 2019

(30) Foreign Application Priority Data
Jun. 22, 2018    (JP) .............................. JP2018-118948

(51) Int. Cl.
| | | |
|---|---|---|
| B62J 6/026 | (2020.01) | |
| B62J 6/022 | (2020.01) | |
| B62J 17/02 | (2006.01) | |
| B62J 50/22 | (2020.01) | |
| B62J 17/00 | (2020.01) | |

(52) U.S. Cl.
CPC ............... B62J 6/026 (2020.02); B62J 6/022 (2020.02); B62J 17/00 (2013.01); B62J 17/02 (2013.01); B62J 50/22 (2020.02)

(58) Field of Classification Search
CPC ..... B62J 6/02; B62J 17/02; B62J 17/08; B62J 17/10; B62J 99/00; B60Q 1/00; B60Q 1/0035; B60Q 1/04; B60Q 1/0408
See application file for complete search history.

(56) References Cited

U.S. PATENT DOCUMENTS

| | | | |
|---|---|---|---|
| 8,260,504 B2* | 9/2012 | Tsujii | B60Q 1/12 |
| | | | 701/48 |
| 8,987,991 B2* | 3/2015 | Ikeda | B62J 6/02 |
| | | | 315/82 |
| D762,146 S | 7/2016 | Takeda | |
| D805,000 S | 12/2017 | Umemoto | |
| 9,944,340 B2* | 4/2018 | Kheawhorm | F21S 41/19 |
| 2013/0168039 A1* | 7/2013 | Arai | B60H 1/00021 |
| | | | 165/41 |
| 2017/0334488 A1 | 11/2017 | Takata et al. | |

\* cited by examiner

*Primary Examiner* — Tony H Winner
*Assistant Examiner* — Michael R Stabley
(74) *Attorney, Agent, or Firm* — Keating and Bennett, LLP

(57) ABSTRACT

A vehicle includes a vehicle body frame, a front wheel, a handle, a pair of left and right first front lights, and a pair of left and right second front lights. The front wheel is supported by the vehicle body frame. The handle is located farther to the rear than a rotation axis of the front wheel, and is operated by an occupant to turn the front wheel. The pair of left and right first front lights extend linearly in the left-right direction, and are located farther to the rear than a front end of the front wheel and farther to the front than the handle. The pair of left and right second front lights are provided separately from the first front lights.

12 Claims, 14 Drawing Sheets

VEHICLE

CROSS REFERENCE TO RELATED APPLICATIONS

This application claims the benefit of priority to Japanese Patent Application No. 2018-118948 filed on Jun. 22, 2018. The entire contents of this application are hereby incorporated herein by reference.

BACKGROUND OF THE INVENTION

1. Field of the Invention

The present invention relates to a vehicle.

2. Description of the Related Art

A straddled vehicle described in US Patent Application Publication No. 2017/0334488 includes a pair of left and right front wheels, a pair of left and right headlights located higher than the front wheels, and a front cover provided around the headlights.

In the case of the vehicle described in US Patent Application Publication No. 2017/0334488, when the front of the vehicle is illuminated only by the pair of left and right headlights, large-sized headlights are necessary to provide a necessary amount of light. Therefore, the vehicle becomes heavy.

SUMMARY OF THE INVENTION

In order to overcome the previously unrecognized and unsolved challenges described above, preferred embodiments of the present invention provide vehicles each including a vehicle body frame, a front wheel, a handle, a pair of left and right first front lights, and a pair of left and right second front lights. The front wheel is supported by the vehicle body frame. The handle is located farther to the rear than a rotation axis of the front wheel, and is operated by an occupant to turn the front wheel. The pair of left and right first front lights extend linearly in the left-right direction, and are located farther to the rear than a front end of the front wheel and farther to the front than the handle. The pair of left and right second front lights are provided separately from the first front lights.

With the above structural arrangement, the headlights of the vehicle are divided into first front lights and second front lights. Therefore, even when the second front lights are downsized, a sufficient amount of light for illuminating the front of the vehicle is provided by both of the first front lights and the second front lights. The first front lights are narrow and elongated in the left-right direction and the downsized second front lights make it possible to reduce the weight of the vehicle.

In a preferred embodiment of the present invention, the second front lights are located lower than the first front lights. With this structural arrangement, by locating the first front lights higher than the second front lights to obtain a design effect that makes the first front lights more prominent than the second front light, both a sufficient amount of light at the front of the vehicle and a reduction in the weight of the vehicle are realized.

In this case, the second front lights are preferably located directly below the first front lights. With this structural arrangement, light emitted from both of the first front lights and the second front lights, which are located close to each other in the up-down direction, makes it possible to provide a similar amount of emitted light as one large-sized headlight.

In a preferred embodiment of the present invention, the first front lights are located farther to the front than the second front lights. With this structural arrangement, while a design effect is obtained that makes the first front lights more prominent than the second front lights, both a sufficient amount of light at the front of the vehicle and a reduction in the weight of the vehicle are realized.

In a preferred embodiment of the present invention, it is preferable that the vehicle further includes a display located farther to the rear than the second front lights and that displays information to an occupant of the vehicle.

In a preferred embodiment of the present invention, a width of an irradiation surface of each of the first front lights is larger than a width of an irradiation surface of each of the second front lights. With this structural arrangement, while a design effect is obtained that makes the first front lights more prominent than the second front lights, both a sufficient amount of light at the front of the vehicle and a reduction in the weight of the vehicle are realized.

In a preferred embodiment of the present invention, the first front lights extend laterally outward and upward. With this structural arrangement, while a design effect is obtained that makes the first front lights shaped like elongated slit-shaped eyes, both a sufficient amount of light at the front of the vehicle and a reduction in the weight of the vehicle are realized.

In a preferred embodiment of the present invention, the vehicle may further include a front cover. The front cover is disposed around the first front lights and the second front lights so as to cover at least a portion of a front portion of the vehicle body frame located farther to the front than the handle.

In a preferred embodiment of the present invention, the front cover has a shape that exposes the first front lights and the second front lights forward and laterally outward. With this structural arrangement, while light emitted from the first front lights is easily distinguished from light emitted from the second front lights from the front side and the lateral outer sides, both a sufficient amount of light at the front of the vehicle and a reduction in the weight of the vehicle are realized.

In a preferred embodiment of the present invention, the pair of left and right second front lights are concealed behind the front cover in a planar view. With this structural arrangement, sunlight is blocked by the front cover so that light emitted from the second front lights that are concealed behind the front cover are not easily influenced by sunlight. Accordingly, while distinguishability of light emitted from the second front lights is improved, both a sufficient amount of light at the front of the vehicle and a reduction in the weight of the vehicle are realized.

In a preferred embodiment of the present invention, the pair of left and right first front lights are respectively along a left edge and a right edge of the front cover. With this structural arrangement, while a sense of unity in design of the first front lights and the front cover is obtained, both a sufficient amount of light at the front of the vehicle and a reduction in the weight of the vehicle are realized.

In a preferred embodiment of the present invention, it is preferable that the front cover is made of a resin, for example.

In a preferred embodiment of the present invention, the vehicle further includes a left and right pair of the front wheels, a pair of left and right front arms, and a pair of left and right front shock absorbers. The pair of left and right front arms respectively support the left and right front wheels, and are attached to the vehicle body frame in a swingable manner. The pair of left and right front shock absorbers are located at the same positions in the front-rear direction as the first front lights. The pair of left and right front shock absorbers respectively join the pair of left and right front arms to the vehicle body frame.

In a preferred embodiment of the present invention, the vehicle includes a seat that is straddled by an occupant such that the vehicle is a so-called straddled vehicle. With this structural arrangement, the straddled vehicle is able to provide a sufficient amount of light for illuminating the front of the vehicle, and the vehicle is able to be reduced in weight.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention are described in detail with reference to the drawings. In the following description, the front-rear, the left-right, and the up-down are directions defined based on a viewpoint of an occupant seated on a seat on the vehicle so as to face the handle. The left-right direction is a vehicle width direction of the vehicle. The description is given based on a state in which the vehicle is placed on a horizontal plane H.

Figure 1:
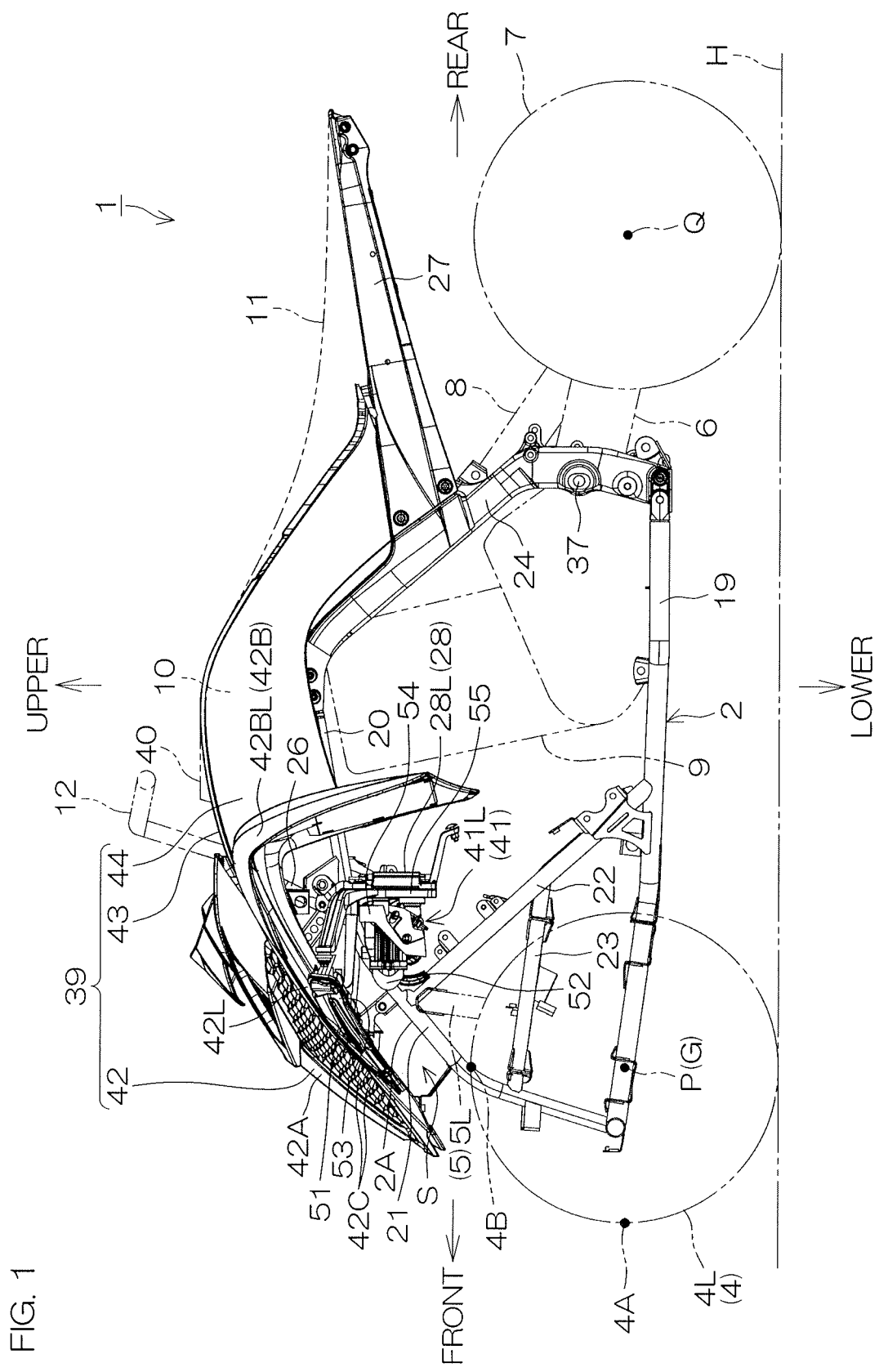
FIG. 1 is a left side view of a vehicle according to a first preferred embodiment of the present invention.

FIG. 1 is a left side view of a vehicle 1 according to a first preferred embodiment of the present invention. The vehicle 1 belongs to the category of utility vehicles, for example, and more specifically, to an all-terrain vehicle (ATV) that travels in forests and deserts, etc. The vehicle 1 in the present preferred embodiment is a straddled vehicle. The vehicle 1 includes a vehicle body frame 2, a pair of left and right front arms 3 (refer to FIG. 3 described later), a pair of left and right front wheels 4, and a pair of left and right front shock absorbers 5. The vehicle 1 further includes a swing arm 6 extending rearward from the vehicle body frame 2, a pair of left and right rear wheels 7 supported by a rear end portion of the swing arm 6, and a rear shock absorber 8. The vehicle 1 includes an engine 9, a fuel tank 10, a seat 11, and a handle 12, which are supported by the vehicle body frame 2.

Figure 2:
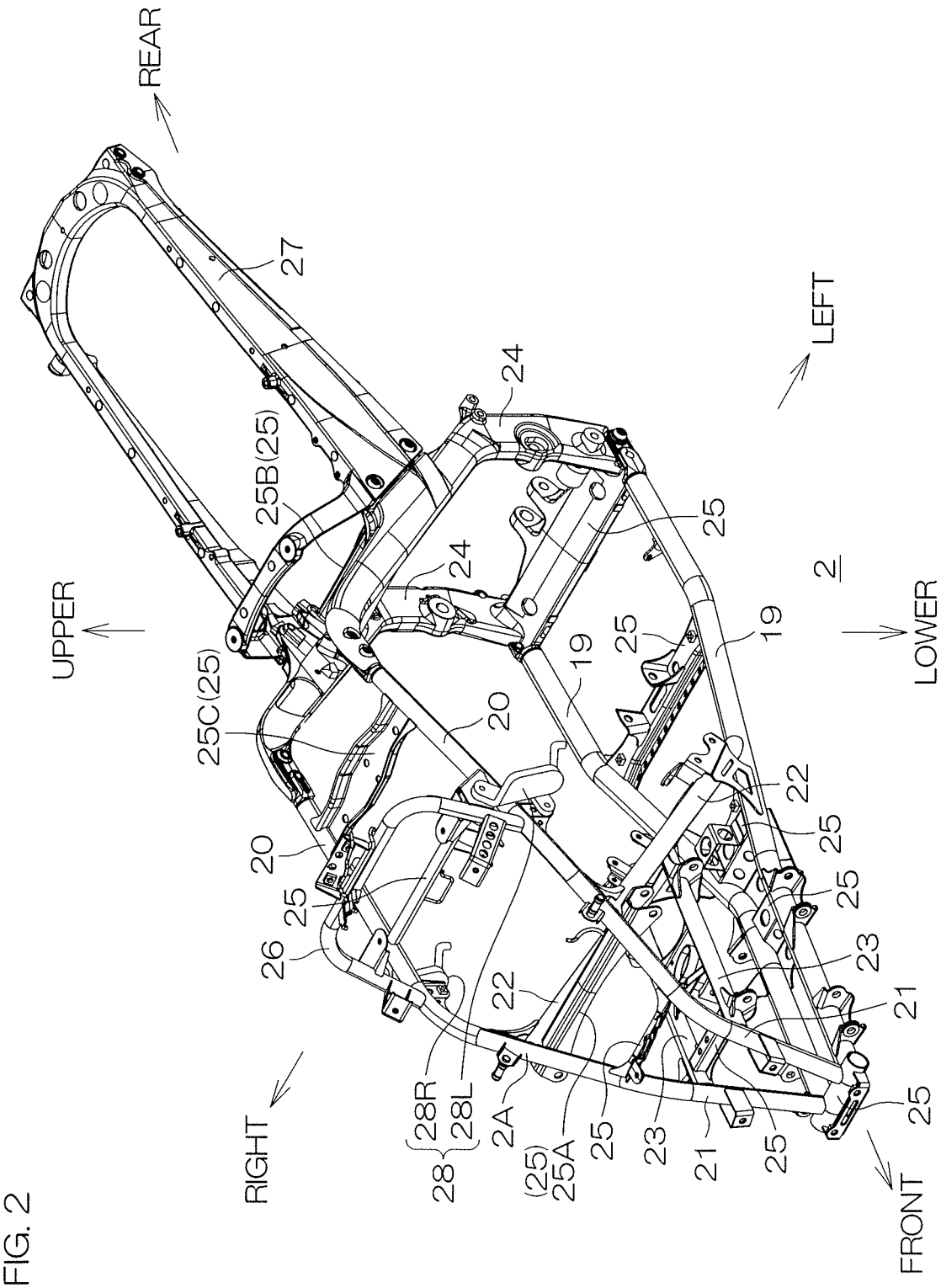
FIG. 2 is a perspective view of a vehicle body frame of the vehicle.

FIG. 2 is a perspective view of the vehicle body frame 2. The vehicle body frame 2 defines a vehicle body of the vehicle 1. The vehicle body frame 2 includes a pair of left and right lower frames 19, a pair of left and right upper frames 20, a pair of left and right front frames 21, and a pair of left and right rear frames 24. The vehicle body frame 2 further includes a pair of left and right first front cross members 22 that couple the lower frames 19 and the front frames 21, and a pair of left and right second front cross members 23 that couple the front frames 21 and the first front cross members 22. The vehicle body frame 2 further includes a plurality of transverse cross members 25, a support frame 26, and a seat rail 27.

The pair of left and right lower frames 19 extend in the front-rear direction. The pair of lower frames 19 are arranged bilaterally symmetrically, and an interval between these in the left-right direction narrows toward the front. The pair of left and right upper frames 20 are located above the lower frames 19 and extend in the front-rear direction. The pair of upper frames 20 are arranged bilaterally symmetrically, and an interval between these in the left-right direction widens toward the front.

The pair of left and right front frames 21 respectively extend forward and downward from front ends of the left and right upper frames 20, and are joined to front ends of the left and right lower frames 19. The pair of front frames 21 are arranged bilaterally symmetrically, and an interval between these in the left-right direction narrows toward the front. The pair of left and right first front cross members 22 respectively extend rearward and downward from intermediate portions of the left and right front frames 21, and are joined to intermediate portions of the left and right lower frames 19. The pair of left and right first front cross members 22 are arranged bilaterally symmetrically. The pair of left and right second front cross members 23 are respectively located above front portions of the left and right lower frames 19, and join the intermediate portions of the left and right front frames 21 and the intermediate portions of the first front cross members 22 to each other.

The pair of left and right rear frames 24 respectively extend rearward and downward from rear ends of the left and right upper frames 20, and are joined to rear ends of the left and right lower frames 19.

The plurality of transverse cross members 25 respectively extend in the left-right direction. The plurality of transverse cross members 25 respectively extend across the left and right lower frames 19, across the left and right upper frames 20, across the left and right front frames 21, across the left and right first front cross members 22, across the left and right second front cross members 23, and across the left and right rear frames 24.

The support frame 26 preferably has an inverted U-shape, and joins the front ends of the left and right upper frames 20 to each other. In the support frame 26, at a pair of left and right roof portions respectively joined to the left and right upper frames 20, sagging stays 28 are provided. A left and right pair of the stays 28 are provided. A left stay 28L of the pair of stays 28 overhangs leftward from the left upper frame 20, and a right stay 28R overhangs rightward from the right upper frame 20. The stays 28 may be integral with the vehicle body frame 2, or may be provided as resin components separate from the vehicle body frame 2 and attached to the vehicle body frame 2 by fasteners such as bolts.

The seat rail 27 preferably has a U-shape in a planar view of the vehicle, is connected to intermediate portions of the left and right rear frames 24 and extends rearward.

Figure 3:
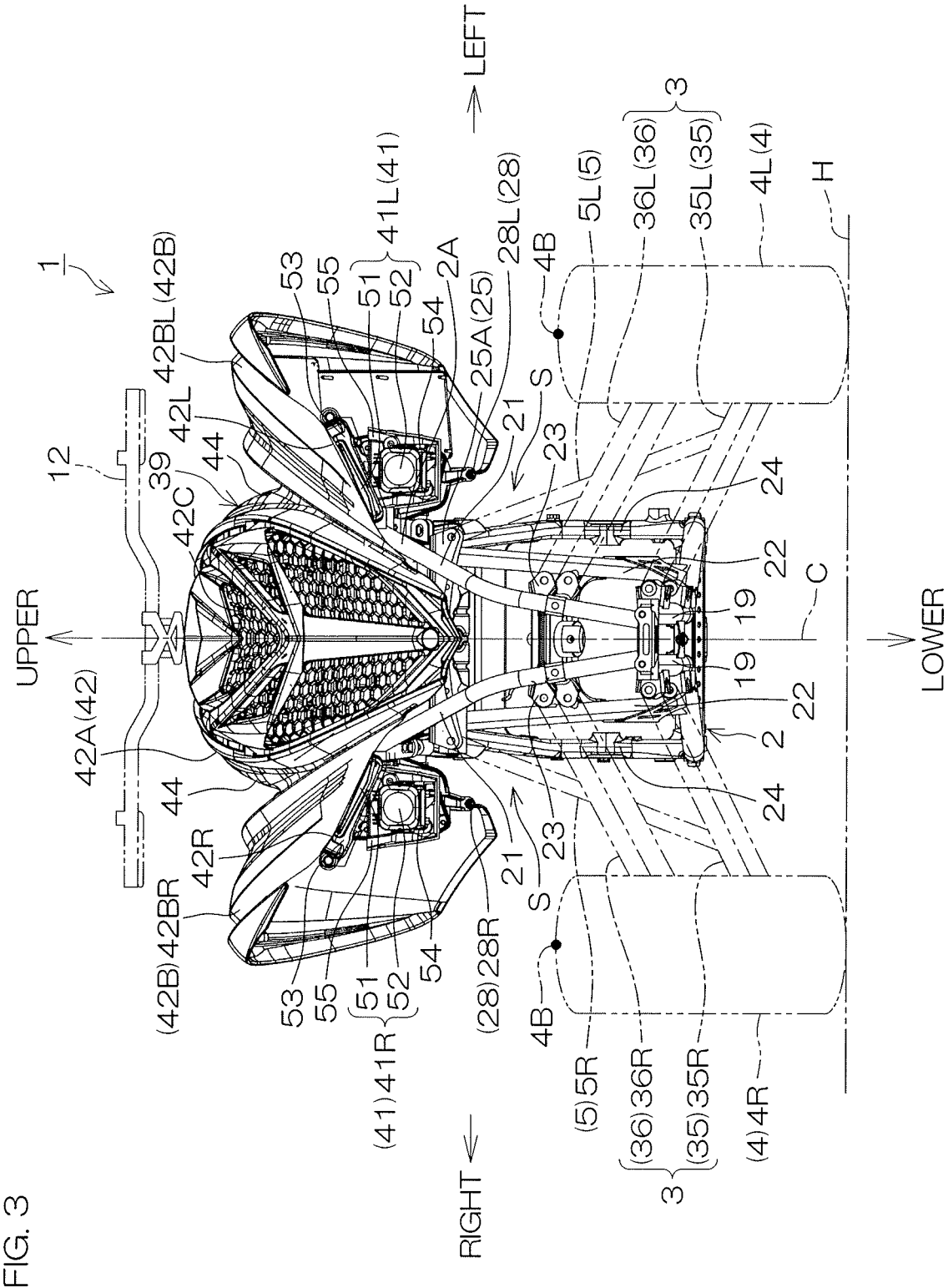
FIG. 3 is a front view of the vehicle.

FIG. 3 is a front view of the vehicle 1. The pair of left and right front arms 3 include a pair of left and right lower arms 35 and a pair of left and right upper arms 36. The left lower arm 35L is joined to a front portion of the left lower frame 19 and extends leftward. A left upper arm 36L is located higher than the lower arm 35L, and joined to the left second front cross member 23 and extends leftward. The lower arm 35L and the upper arm 36L are able to respectively swing up and down around their right ends. A right lower arm 35R is joined to a front portion of the right lower frame 19 and extends rightward. A right upper arm 36R is located higher than the lower arm 35R, and joined to the right second front cross member 23 and extends rightward. The lower arm 35R and the upper arm 36R are able to swing up and down around their respective left ends.

The front wheels 4 include tires. Block-patterned irregularities for traveling on irregular ground may be provided on the surfaces of the tires (refer to FIG. 15 and FIG. 16 described later). The same applies to the rear wheels 7. The pair of left and right front wheels 4 sandwich the front portion of the vehicle body frame 2. A left front wheel 4L is joined to respective left ends of the lower arm 35L and the upper arm 36L through knuckle arms (not shown). A right front wheel 4R is joined to respective right ends of the lower arm 35R and the upper arm 36R through other knuckle arms (not shown). Accordingly, the pair of left and right front wheels 4 are supported movably up and down by the vehicle body frame 2 through the pairs of left and right lower arms 35 and upper arms 36.

The pair of left and right front shock absorbers 5 include a left front shock absorber 5L and a right front shock absorber 5R. A lower end of the front shock absorber 5L is joined to the lower arm 35L. An upper end of the front shock absorber 5L is joined to a left end of the transverse cross member 25A (refer to FIG. 2 as well) located at a joint portion between the front frame 21 and the first front cross member 22 among the plurality of transverse cross members 25. A lower end of the front shock absorber 5R is joined to the lower arm 35R. An upper end of the front shock absorber 5R is joined to a right end of the transverse cross member 25A. Each lower arm 35 is directly joined to the vehicle body frame 2 at the lower frame 19, and joined to the vehicle body frame 2 through the front shock absorber 5. Referring to FIG. 1, the first front cross members 22 are located farther to the rear than the front wheels 4 and the front shock absorbers 5 in a side view.

The swing arm 6 is joined to a pivot shaft 37 that extends between lower portions of the left and right rear frames 24 on the vehicle body frame 2, and extends rearward from the pivot shaft 37. The swing arm 6 is swingable up and down around the pivot shaft 37.

The pair of left and right rear wheels 7 sandwich a rear portion of the swing arm 6 and are attached to the rear portion of the swing arm 6. Accordingly, the pair of left and right rear wheels 7 are supported movably up and down by the swing arm 6. In the vehicle body frame 2, at least the upper frames 20 and the seat rail 27 are located higher than rotation axes P of the front wheels 4 and rotation axes Q of the rear wheels 7.

A lower end of the rear shock absorber 8 is joined to the swing arm 6. An upper end of the rear shock absorber 8 is joined to a transverse cross member 25B (refer to FIG. 2) that extends between the left and right rear frames 24 in the vehicle body frame 2.

An example of the engine 9 is an internal combustion engine including a crankshaft (not shown) that rotates around a crank axis extending in the left-right direction. The engine 9 is located farther to the front than the swing arm 6. The engine 9 is placed on the left and right lower frames 19 in the vehicle body frame 2, and fixed to the lower frames 19. Rotation of the crankshaft is transmitted to the rear wheels 7 through, for example, chains (not shown).

The fuel tank 10 stores fuel for the engine 9. Fuel of the engine 9 is, for example, gasoline. The fuel tank 10 is located higher than the engine 9. The fuel tank 10 is placed on a transverse cross member 25C (refer to FIG. 2) that extends between the left and right upper frames 20 in the vehicle body frame 2, and fixed to at least either of the upper frames 20 and the transverse cross member 25C.

The seat 11 is elongated in the front-rear direction, and is located on the rear side of the fuel tank 10 at the center of the vehicle 1 in the vehicle width direction. The seat 11 is fixed to the seat rail 27 of the vehicle body frame 2. An occupant is able to straddle and sit on the seat 11.

The handle 12 is located farther to the rear than the rotation axes P of the front wheels 4 and farther to the front than rotation axes Q of the rear wheels 7. More specifically, the handle 12 is located farther to the rear than the rotation axes P of the front wheels 4 in a neutral state in which the turning angle is zero. At any turning angle of the front wheels 4, the handle 12 is located farther to the rear than the centers of gravity G (refer to FIG. 13 described later as well) of the front wheels 4. The handle 12 is supported turnably by a support frame 26 (refer to FIG. 2) of the vehicle body frame 2. The handle 12 is operated by an occupant seated on the seat 11 to turn the front wheels 4.

The vehicle 1 further includes an exterior component 39, a display 40, and a pair of left and right headlights 41. The exterior component 39 is made of, for example, a resin, and is attached to the vehicle body frame 2. The exterior component 39 includes a front cover 42, a top cover 43, and a pair of left and right side covers 44.

The front cover 42 covers at least a portion of a front portion 2A of the vehicle body frame 2 from above and is located farther to the front than the handle 12. The front portion 2A in the present preferred embodiment includes at least rear portions of the left and right front frames 21. The front cover 42 includes a main body 42A, and a pair of left and right fenders 42B that overhang laterally outward from the main body 42A.

The main body 42A preferably has a plate shape. The main body 42A inclines so as to gently lower toward the front. The main body 42A has a width narrowing toward the front in a planar view (refer to FIG. 3). In an upper surface of the front cover 42, a plurality of ventilation holes 42C arrayed in a honeycomb pattern as shown in FIG. 1 may be provided.

Each fender 42B extends rearward and is bent downward. The fenders 42B face the corresponding front wheels 4 from above and behind. A left edge of a left fender 42BL of the pair of left and right fenders 42B defines a left edge 42L of the front cover 42, and a right edge of a right fender 42BR defines a right edge 42R of the front cover 42 (refer to FIG. 3 as well).

The top cover 43 is located at the front side of the seat 11, and covers at least portions of the left and right upper frames 20 from above. The handle 12 is located above the top cover 43.

The side covers 44 extend rearward from upper portions of the corresponding fenders 42B in the left-right direction to the seat rail 27. The left side cover 44 covers at least portions of the left upper frame 20 and the left rear frame 24 from the left side. The right side cover 44 covers at least portions of the right upper frame 20 and the right rear frame 24 from the right side. The fuel tank 10 is covered by the top cover 43 from above, and covered by the pair of left and right side covers 44 from lateral outer sides.

The display 40 is exposed from the upper surface of the top cover 43. The display 40 may be provided on the top cover 43, or may be provided on a central portion of the handle 12. The display 40 is provided with meters (not shown) such as a speedometer. Therefore, information for an occupant, such as a speed of the vehicle, are displayed on the display 40.

Referring to FIG. 3, the pair of left and right headlights 41 include a left headlight 41L and a right headlight 41R. Each headlight 41 includes one first front light 51, and one second front light 52 provided separately from the first front light 51. Therefore, the pair of left and right headlights 41 include a pair of left and right first front lights 51 and a pair of left and right second front lights 52.

The headlight 41L and the headlight 41R are arranged bilaterally symmetrically about a centerline C in the vehicle width direction of the vehicle 1. Hereinafter, the headlights 41 are described by mainly focusing on the headlight 41L, and description in which the left and right sides in the following description about the headlight 41L are reversed corresponds to description about the headlight 41R.

Figure 4:
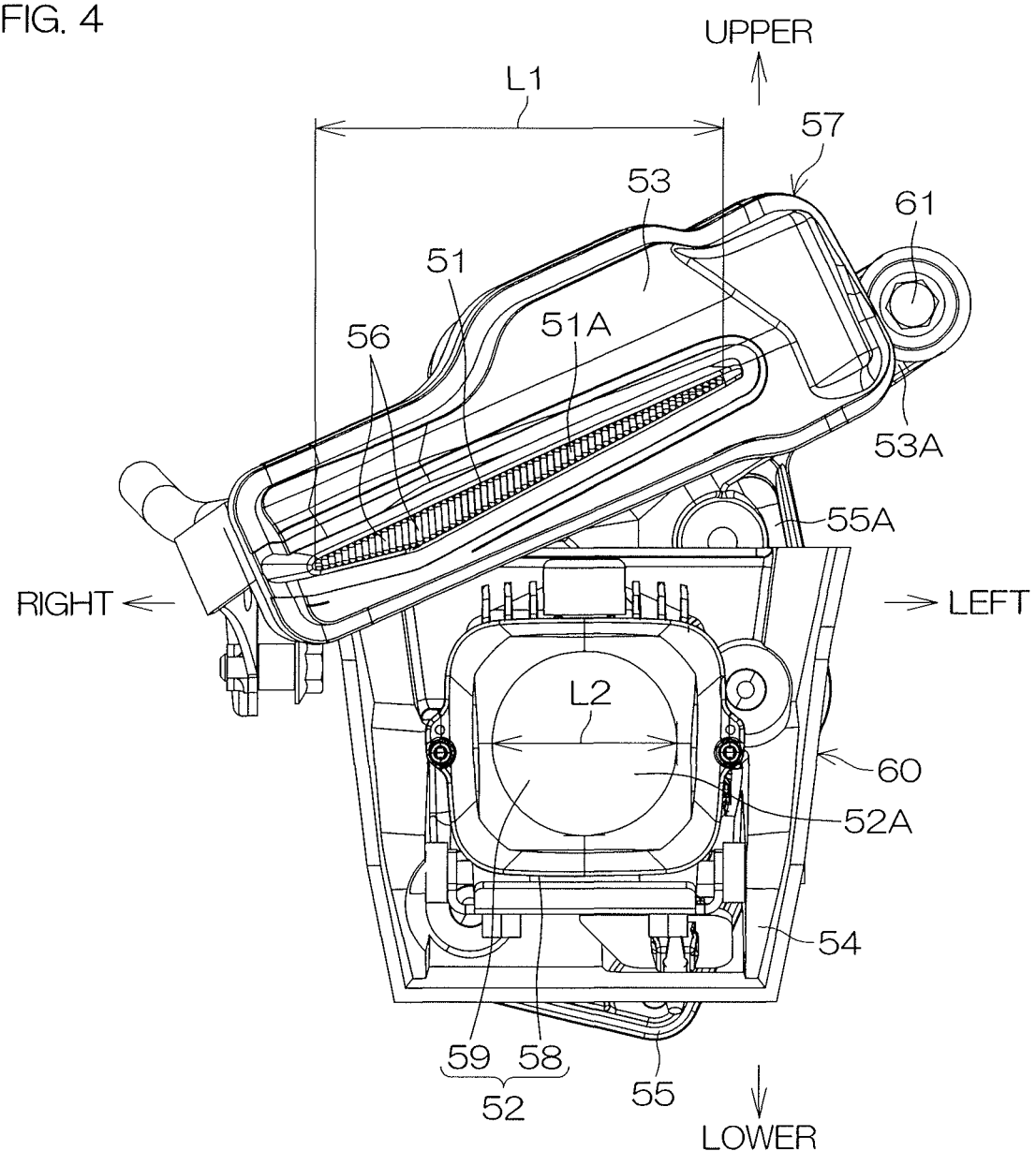
FIG. 4 is a front view of a headlight of the vehicle.
Figure 5:
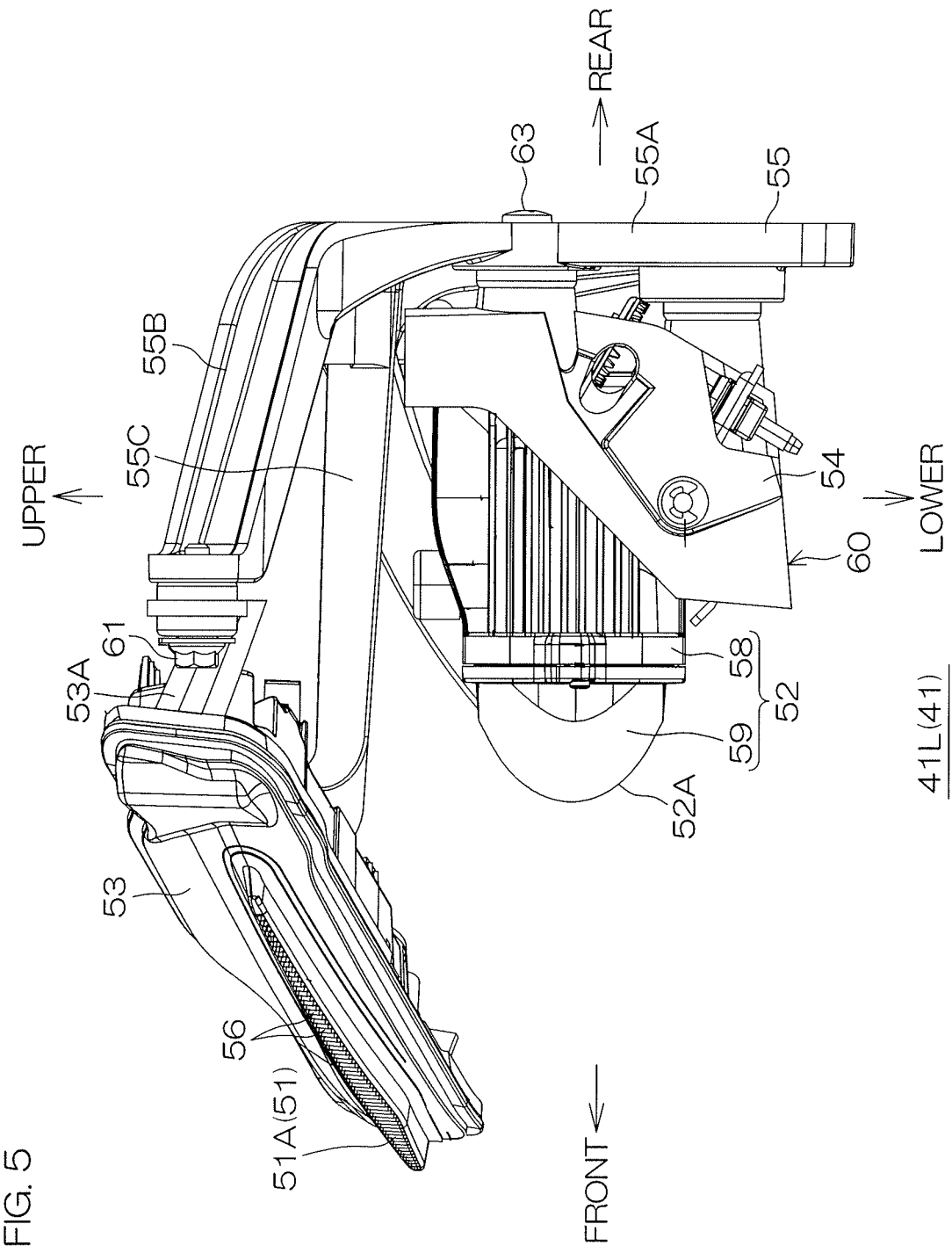
FIG. 5 is a left side view of the headlight.
Figure 6:
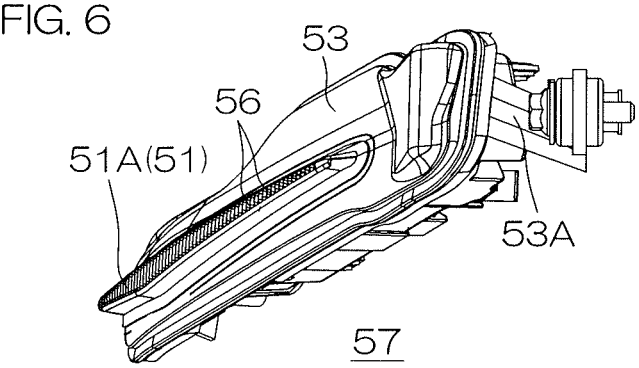
FIG. 6 is a left side view of a first assembly of the headlight.
Figure 7:
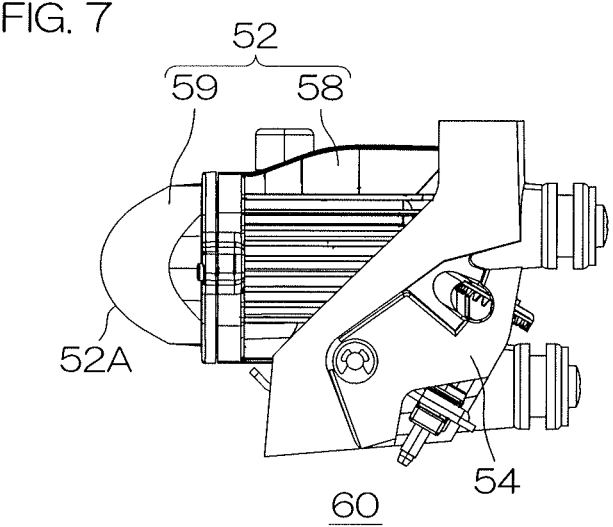
FIG. 7 is a left side view of a second assembly of the headlight.

FIG. 4 is a view in which the headlight 41L is extracted from FIG. 3. FIG. 5 is a view in which the headlight 41L is extracted from FIG. 1. The headlight 41L includes, in addition to the first front light 51 and the second front light 52, a first holder 53, a second holder 54, and a bracket 55. As shown in FIG. 6, the first front light 51 and the first holder 53 that supports the first front light 51 define a first assembly 57. As shown in FIG. 7, the second front light 52 and the second holder 54 that supports the second front light 52 define a second assembly 60.

The first holder 53 preferably has, for example, a plate shape elongated in the left-right direction. The first holder 53 inclines upward and rearward as it extends laterally outward (leftward in the case of the headlight 41L).

The first front light 51 is provided at substantially the center in the up-down direction on the front surface of the first holder 53. The first front light 51 projects forward from the front surface of the first holder 53, and extends linearly in the left-right direction. The first front light 51 extends over substantially the entire region in the left-right direction of the front surface of the first holder 53. The first front light 51 inclines upward and rearward as it extends laterally outward similarly to the first holder 53. The front end surface of the first front light 51 defines an irradiation surface 51A of the first front light 51. The irradiation surface 51A has a width L1 (refer to FIG. 4). The width L1 is a width of the irradiation surface 51A in the horizontal direction in a front view (horizontal distance between a left end and a right end of the irradiation surface 51A). In the irradiation surface 51A, a luminous body 56 such as an LED is embedded. A plurality of luminous bodies 56 may be provided, and in this case, the plurality of luminous bodies 56 extend vertically and may be aligned left and right so as to fill the irradiation surface 51A.

The second holder 54 preferably has, for example, a cup shape including an internal space exposed forward.

The second front light 52 includes a base 58 extending in the front-rear direction, and a luminous body 59 provided at a front end of the base 58 (refer to FIG. 5). A rear end of the base 58 is fixed to the second holder 54. At least the front end of the base 58 protrudes forward from the second holder 54. The luminous body 59 includes an LED or a halogen lamp, etc. A front surface of the luminous body 59 defines an irradiation surface 52A of the second front light 52. The irradiation surface 52A preferably has, for example, a semi-spherical shape, and bulges forward in an arc shape. The irradiation surface 52A has a width L2 (refer to FIG. 4). The width L2 is a width of the irradiation surface 52A in the horizontal direction in a front view (horizontal distance between a left end and a right end of the irradiation surface 52A). The width L1 of the irradiation surface 51A of the first front light 51 is larger than the width L2 of the irradiation surface 52A of the second front light 52 (refer to FIG. 4).

Figure 8:
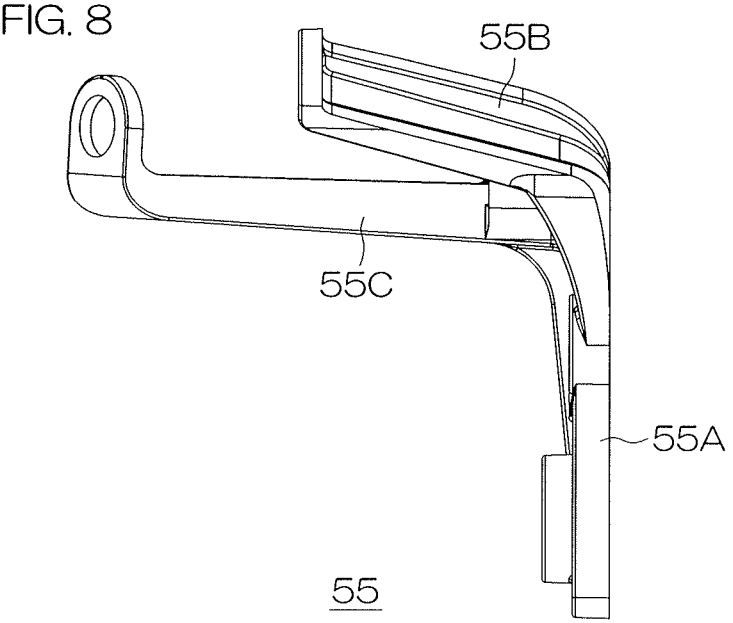
FIG. 8 is a left side view of a bracket in the headlight.

FIG. 8 is a left side view of the bracket 55. The bracket 55 includes a plate portion 55A facing the second front light 52 from the rear side, a left arm portion 55B extending forward from a left end of the plate portion 55A, and a right arm portion 55C extending forward from a right end of the plate portion 55A. A front end of the left arm portion 55B is bent leftward. A front end of the right arm portion 55C is bent upward.

Figure 9:
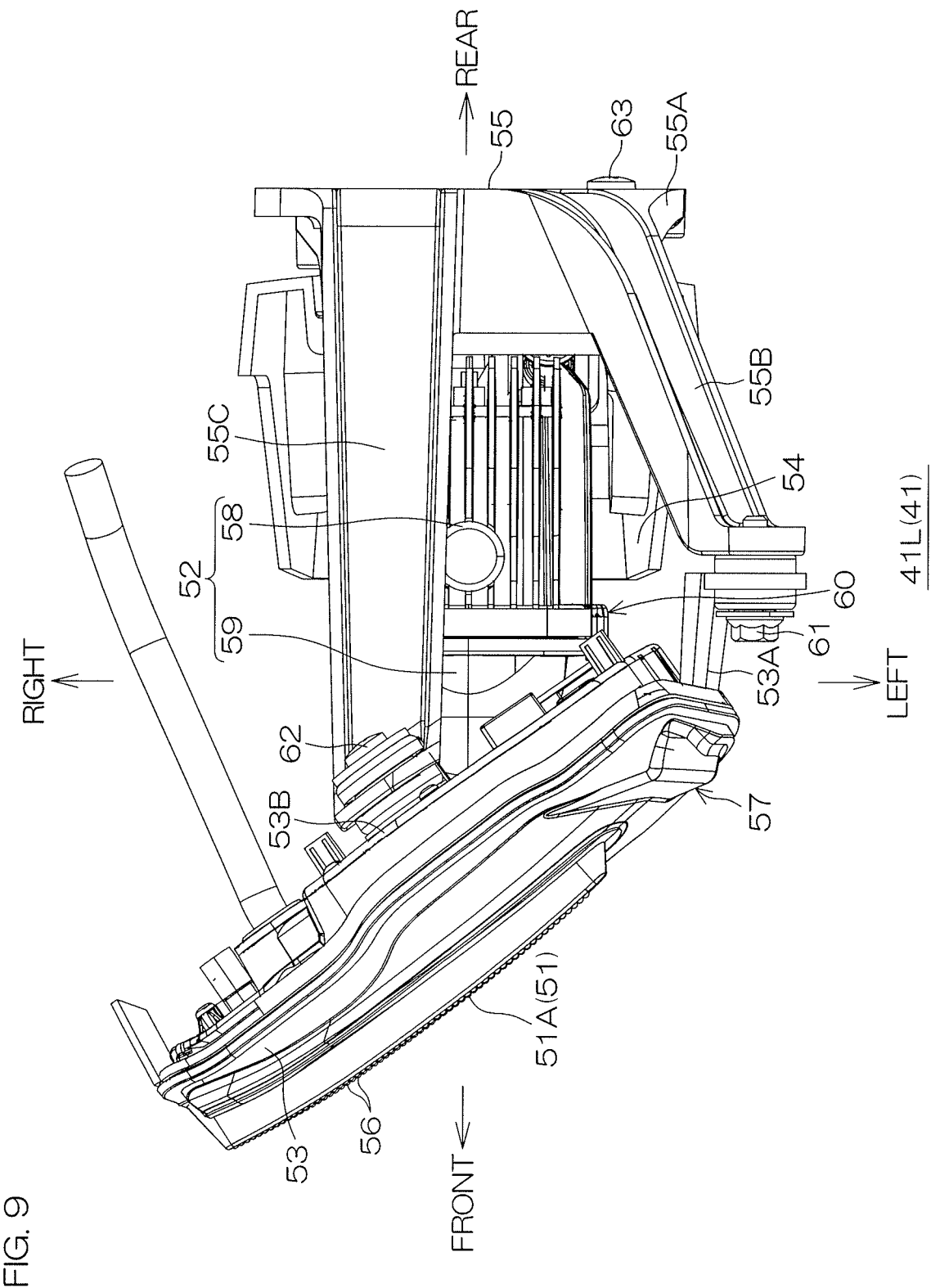
FIG. 9 is a plan view of the headlight.
Figure 10:
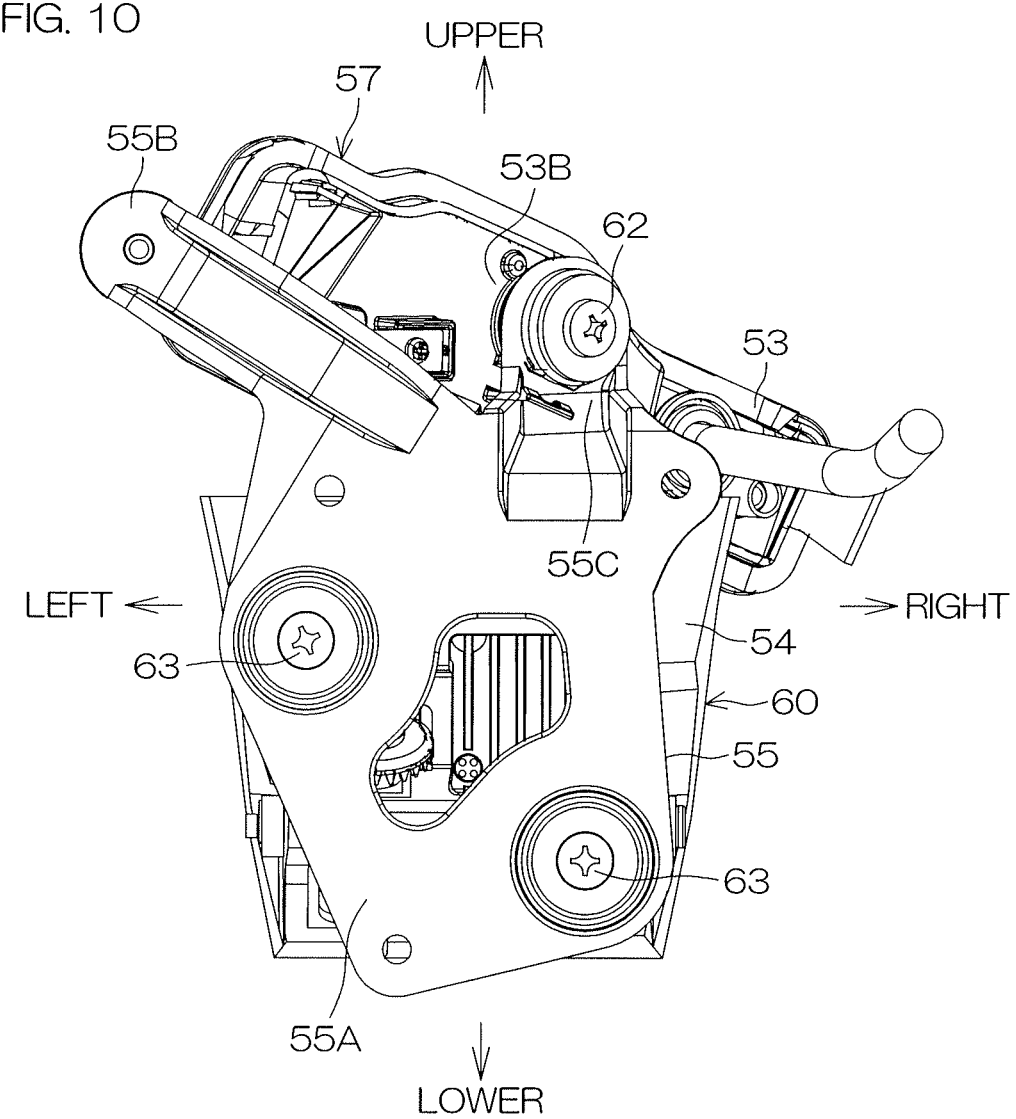
FIG. 10 is a back view of the headlight.

FIG. 9 is a plan view of the headlight 41L. A projecting portion 53A projecting rearward from the left end of the first holder 53 is fixed to the front end of the left arm portion 55B by a fastener 61. An intermediate portion 53B in the left-right direction of the rear surface of the first holder 53 is fixed to the front end of the right arm portion 55C by another fastener 62. Accordingly, the first assembly 57 is coupled to the bracket 55. On the other hand, the second holder 54 is fixed to the front surface of the plate portion 55A by still another fastener 63 (refer to FIG. 10). Accordingly, the second assembly 60 is coupled to the bracket 55. In this way, by fixing the first assembly 57 and the second assembly 60 to the bracket 55, the headlight 41L is assembled.

Figure 11:
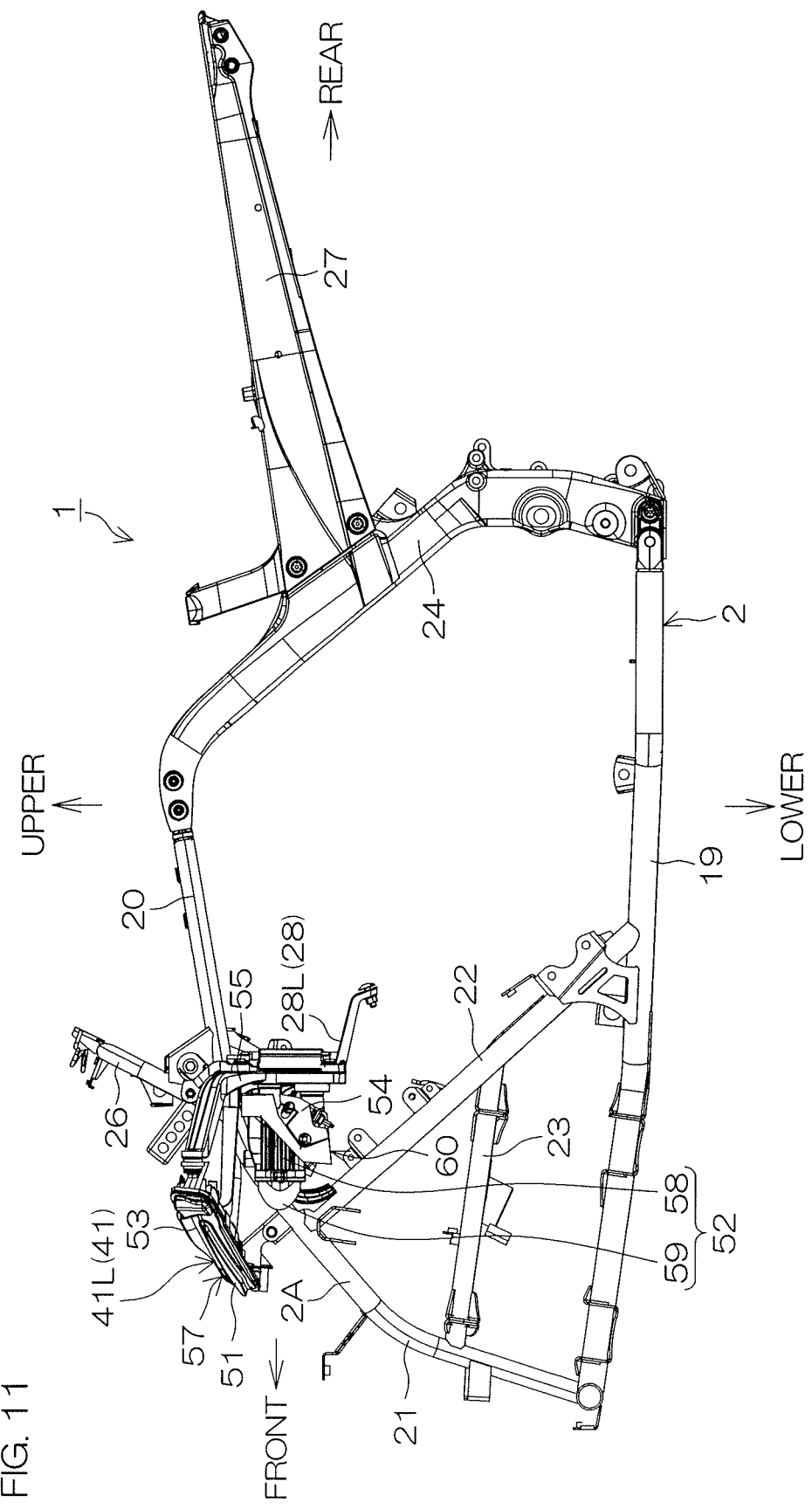
FIG. 11 is a left side view of the vehicle body frame and the headlight.
Figure 12:
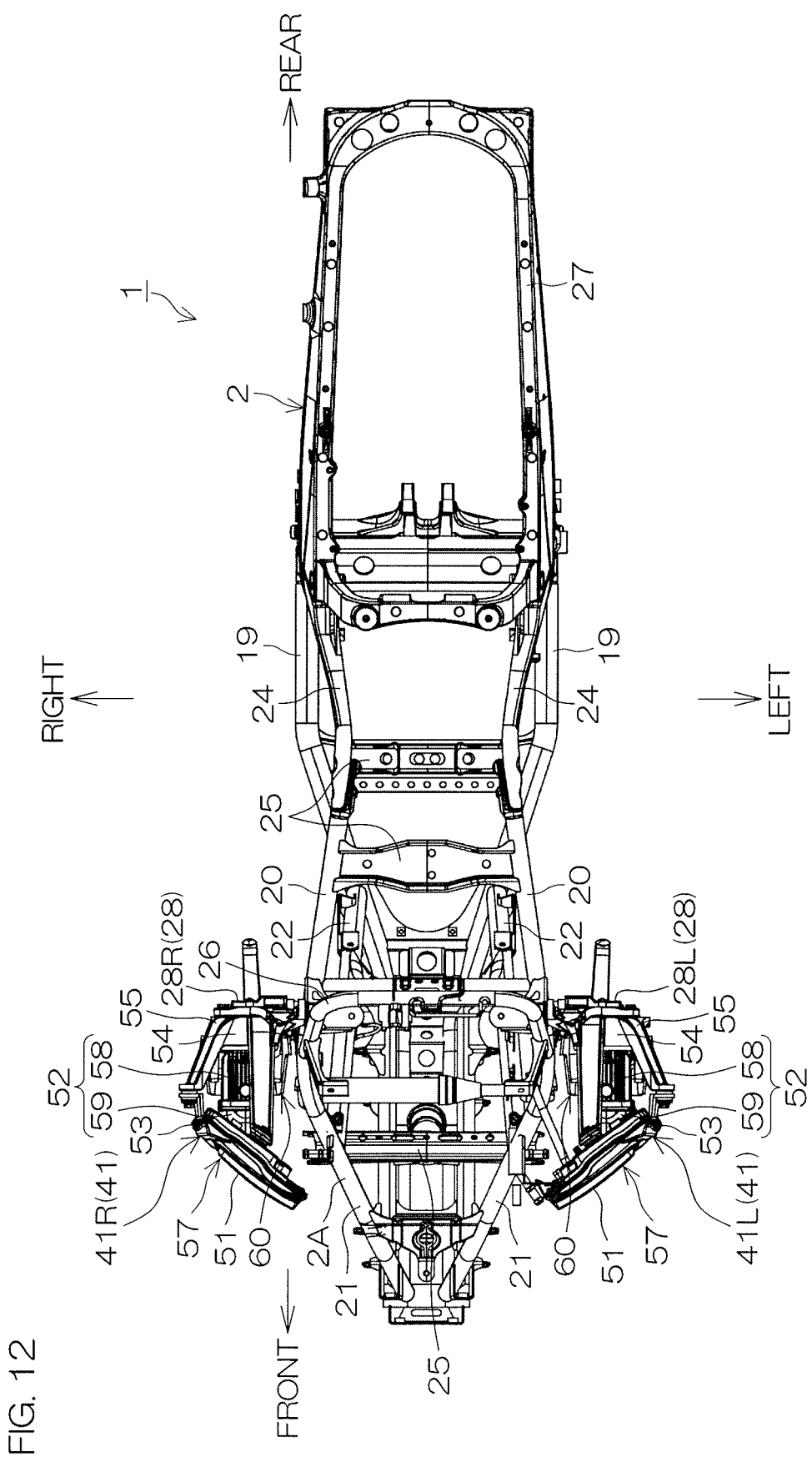
FIG. 12 is a plan view of the vehicle body frame and the headlights.

FIG. 11 is a left side view of the vehicle body frame 2 and the headlight 41. FIG. 12 is a plan view of the vehicle body frame 2 and the headlights 41. The headlight 41L is fixed to the left stay 28L (refer to FIG. 2 as well) in the vehicle body frame 2 by a fastener (not shown), etc. The headlight 41R is fixed to the right stay 28R in the vehicle body frame 2 by another fastener (not shown), etc. The headlight 41L and the headlight 41R are located farther to the outer sides than the vehicle body frame 2 in the vehicle width direction. A radiator (not shown) fixed to the vehicle body frame 2 is located between the headlight 41L and the headlight 41R in the vehicle width direction.

Figure 13:
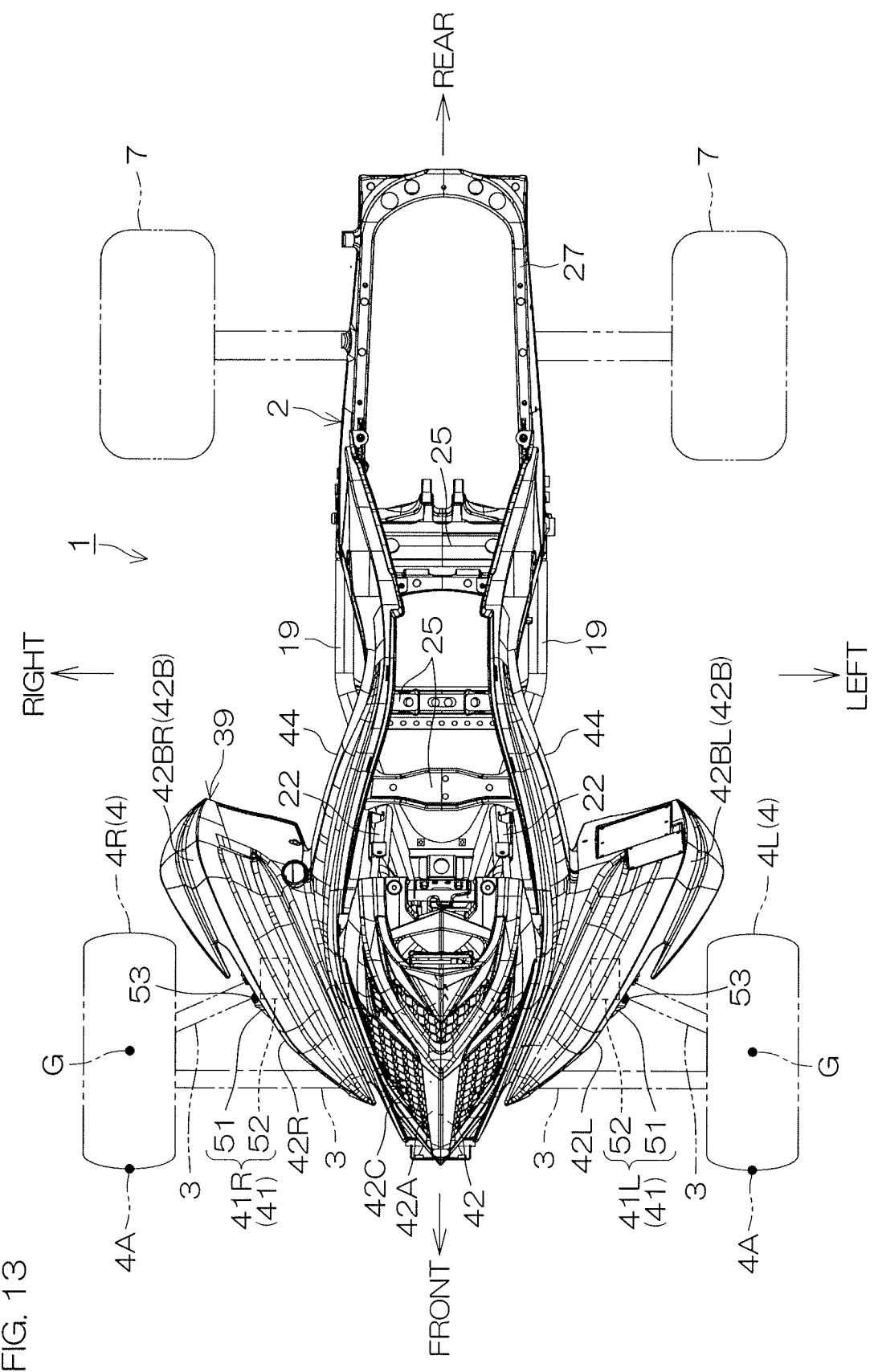
FIG. 13 is a plan view of the vehicle.

FIG. 13 is a plan view of the vehicle 1. FIG. 13 shows a state in which the exterior component 39 is attached to the vehicle body frame 2 shown in FIG. 12. The front cover 42 of the exterior component 39 is disposed around the left and right first front lights 51 and second front lights 52. The ventilation holes 42C in the main body 42A of the front cover 4 guide outside air to the radiator.

The first front light 51 and the second front light 52 of the left headlight 41L are located below the left fender 42BL. The left first front light 51 extends along a left edge 42L of the front cover 42 (refer to FIG. 1 and FIG. 3 as well). At least a portion (rear end in FIG. 13) of the left first front light 51 protrudes farther to the lateral outer side (herein, the left) than the left edge 42L. The entire left second front light 52 is positioned directly below the fender 42BL, and is concealed behind the fender 42BL in a planar view.

The first front light 51 and the second front light 52 in the right headlight 41R are located below the right fender 42BR. The right first front light 51 extends along a right edge 42R of the front cover 42 (refer to FIG. 1 and FIG. 3 as well). At least a portion (rear end in FIG. 13) of the right first front light 51 protrudes farther to the lateral outer side (herein, the right) than the right edge 42R. The entire right second front light 52 is positioned directly below the fender 42BR, and is concealed behind the fender 42BR in a planar view.

As shown in FIG. 1, the fenders 42B of the front cover 42 have shapes extending rearward and bent downward as described above. Therefore, the fenders 42B expose the first front lights 51 and the second front lights 52 located below the fenders forward and laterally outward (refer to FIG. 3 as well).

The left and right headlights 41 are located at the same or similar positions in the front-rear direction as the left and right front arm 3, the front wheels 4 and the front shock absorbers 5 (refer to FIG. 3 and FIG. 13 as well). The left and right headlights 41 (at least the first front lights 51) are located farther to the rear than the front ends 4A of the left and right front wheels 4 and farther to the front than the handle 12. The left and right headlights 41 are located higher than the upper ends 4B of the left and right front wheels 4. Below each headlight 41, a space S is provided that separates the headlight 41 from the front arm 3 that swings up and down (refer to FIG. 3 as well). That is, the vehicle 1 does not include any components adjacent to the headlights 41 from below.

As shown in FIG. 11 and FIG. 12, in each headlight 41, the first front light 51 is located farther to the front than the second front light 52, and the second front light 52 is located lower than the first front light 51. The second front light 52 is located directly below the first front light 51 so as to at least partially overlap the first front light 51 in a planar view. The display 40 is located farther to the rear than the left and right second front lights 52 (refer to FIG. 1).

In each headlight 41, the first front light 51 and the second front light 52 emit light by being supplied with electric power from a power supply (not shown) such as a battery provided in the vehicle 1. As an example, the first front light 51 may function as a position light, and always emits light when a switch (not shown) of the vehicle 1 is ON. The second front light 52 may function as a conventional headlight, and emits light when the engine 9 starts after the switch of the vehicle 1 is turned ON.

As described above, according to the structural arrangement of the present preferred embodiment, the headlight 41 of the vehicle 1 is divided into the first front light 51 and the second front light 52. Therefore, even when the second front lights 52 are downsized, a sufficient amount of light for illuminating the front of the vehicle 1 is able to be provided by using both of the first front lights 51 and the second front lights 52. The first front lights 51, which are narrow and elongated in the left-right direction, and the downsized second front lights 52 make it possible to reduce the weight of the vehicle 1.

Due to the downsizing, the second front lights 52 become less prominent, and this makes it possible to obtain a design effect that makes the first front lights 51 more prominent than the second front lights 52.

The first front lights 51 and the second front lights 52 are preferably separate components, and the first front lights 51 and the second front lights 52 may thus be used as general-purpose products for various vehicle types.

In the present preferred embodiment, the second front lights 52 are located lower than the first front lights 51. With this structural arrangement, by locating the first front lights 51 higher than the second front lights 52 achieves a design effect that makes the first front lights 51 more prominent than the second front lights 52, both a sufficient amount of light at the front of the vehicle 1 and a reduction in the weight of the vehicle 1 are realized.

In the present preferred embodiment, the second front light 52 is located directly below the first front light 51. With this structural arrangement, light emitted from both of the first front light 51 and the second front light 52, which are located close to each other in the up-down direction, makes it possible to provide a similar amount of emitted light as one large-sized headlight.

In the present preferred embodiment, the first front lights 51 are located farther to the front than the second front lights 52. With this structural arrangement, while a design effect is obtained that makes the first front lights 51 more prominent than the second front lights 52, both a sufficient amount of light at the front of the vehicle 1 and a reduction in the weight of the vehicle 1 are realized.

In the present preferred embodiment, the width L1 of the irradiation surface 51A of the first front light 51 is larger than the width L2 of the irradiation surface 52A of the second front light 52 (refer to FIG. 4). With this structural arrangement, while a design effect is obtained that makes the first front lights 51 more prominent than the second front lights 52, both a sufficient amount of light at the front of the vehicle 1 and a reduction in the weight of the vehicle 1 are realized.

In the present preferred embodiment, the first front lights 51 extend laterally outward and upward. With this structural arrangement, a design effect is obtained that makes the first front lights 51 prominent and shaped like elongated slit-shaped eyes, both a sufficient amount of light at the front of the vehicle 1 and a reduction in the weight of the vehicle 1 are realized.

In the present preferred embodiment, the front cover 42 has a shape that exposes the first front lights 51 and the second front lights 52 forward and laterally outward (refer to FIG. 1). With this structural arrangement, while light emitted from the first front lights 51 is easily distinguished from light emitted from the second front lights 52 from the front side and the lateral outer sides, both a sufficient amount of light at the front of the vehicle 1 and a reduction in the weight of the vehicle 1 are realized.

In the present preferred embodiment, the pair of left and right second front lights 52 are concealed behind the front cover 42 in a planar view (refer to FIG. 13). With this structural arrangement, sunlight is blocked by the front cover 42, so that light emitted from the second front lights 52 that are concealed behind the front cover 42 are not easily influenced by sunlight. Accordingly, while distinguishability of light emitted by the second front lights 52 is improved, both a sufficient amount of light at the front of the vehicle 1 and a reduction in the weight of the vehicle 1 are realized.

In the present preferred embodiment, the pair of left and right first front lights 51 extend respectively along the left edge 42L and the right edge 42R of the front cover 42 (refer to FIG. 3). With this structural arrangement, while a sense of unity in design of the first front lights 51 and the front cover 42 is obtained, both a sufficient amount of light at the front of the vehicle 1 and a reduction in the weight of the vehicle 1 are realized.

At the left edge 42L and the right edge 42R, recessed portions may be provided to receive the first front lights 51. By fitting the first front lights 51 in the recessed portions, the left edge 42L and the right edge 42R smoothly extend around the first front lights 51, and this further increases the sense of unity in design described above.

The first front lights 51 contribute to the downsizing of the headlights 41, and do not influence the shape of the front cover 42. Therefore, it is possible to freely design the shape of the front cover 42 without being limited by the entire headlights 41 including the first front lights 51.

Although preferred embodiments of the present invention have been described above, the present invention is not restricted to the contents of these preferred embodiments and various modifications are possible within the scope of the present invention.

Figure 14:
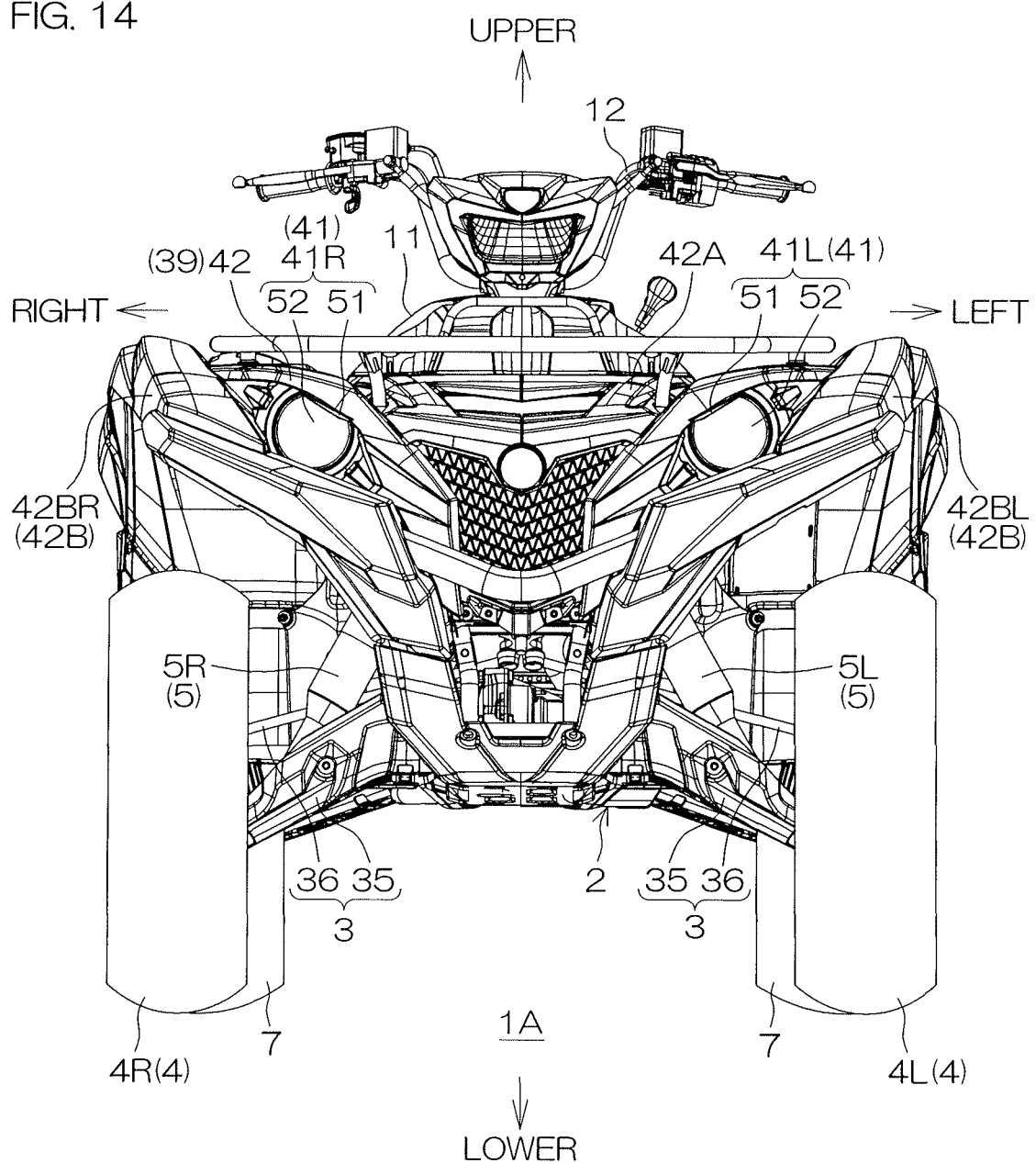
FIG. 14 is a front view of a vehicle according to a second preferred embodiment of the present invention.
Figure 15:
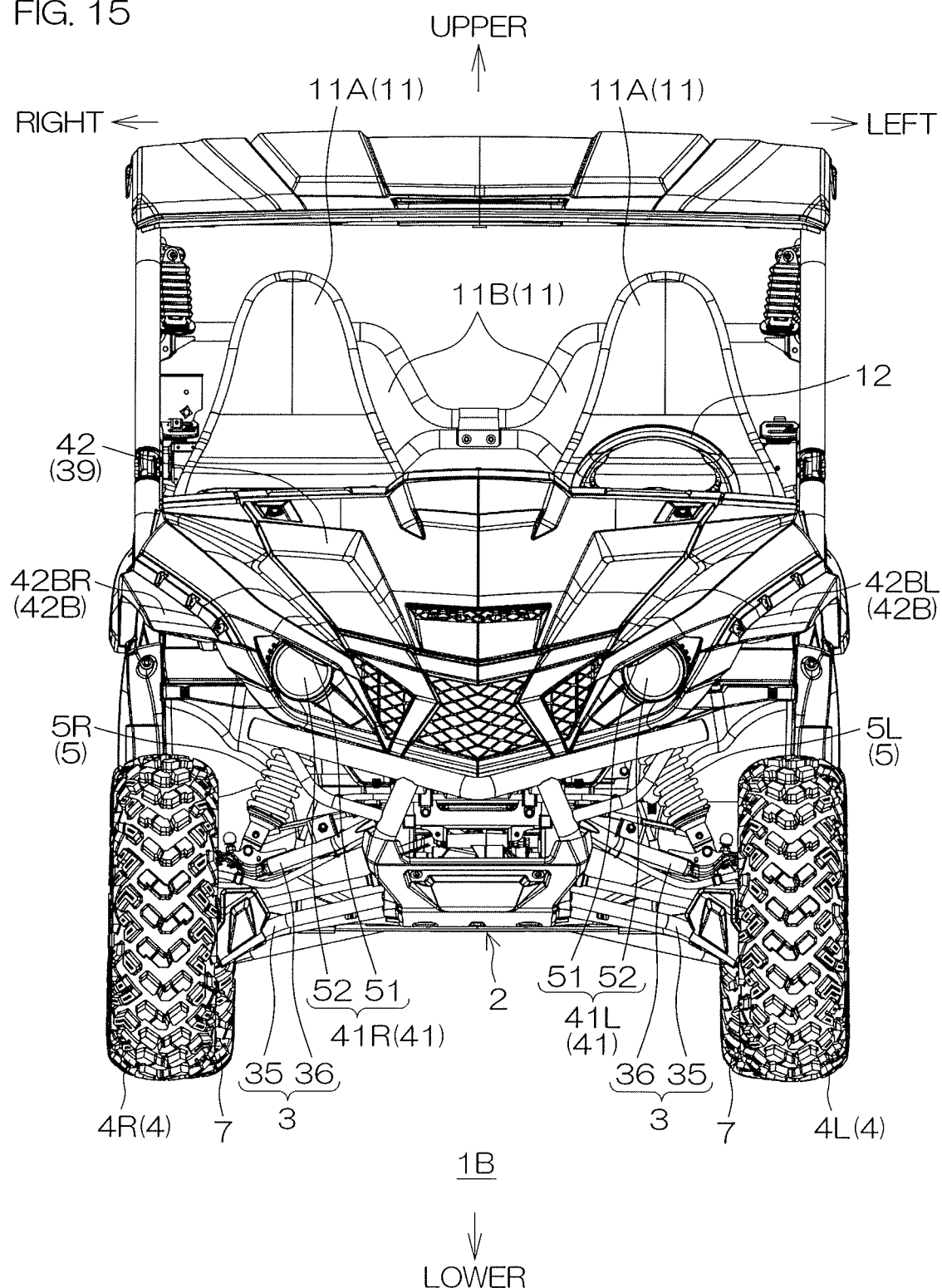
FIG. 15 is a front view of a vehicle according to a third preferred embodiment of the present invention.
Figure 16:
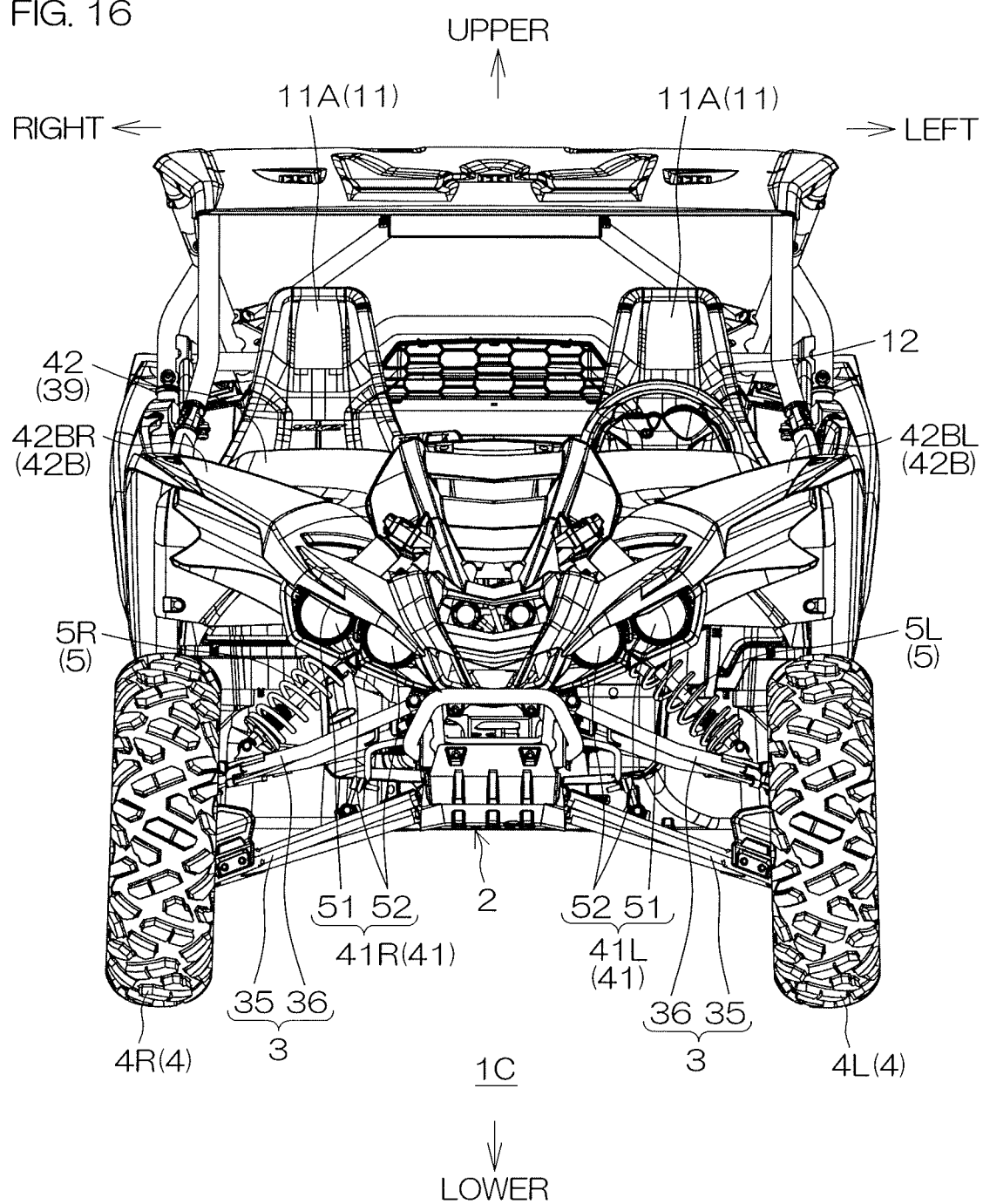
FIG. 16 is a front view of a vehicle according to a fourth preferred embodiment of the present invention.

FIG. 14, FIG. 15, and FIG. 16 are front views of a vehicle 1A, a vehicle 1B, and a vehicle 1C according to second, third, and fourth preferred embodiments of the present invention. Hereinafter, elements that are functionally the same as elements described in relation to the first preferred embodiment described above are provided with the same reference numbers, and detailed description of such elements shall be omitted.

The left and right headlights 41 may be located on the upper surface of the front cover 42 or above the front cover 42 as in the case of the straddled vehicle 1A shown in FIG. 14.

Preferred embodiments of the present invention are also applicable to a vehicle 1B and a vehicle 1C other than straddled vehicles. The vehicle 1B shown in FIG. 15 is a four-seat vehicle, and includes a pair of left and right front seats 11A and a pair of left and right rear seats 11B. The vehicle 1C shown in FIG. 16 is a two-seat vehicle from which the rear seats 11B are omitted for sports traveling. The handles 12 in the vehicle 1B and the vehicle 1C are steering wheels different from the steering bar of the first preferred embodiment, and are located in front of the left front seat 11A.

As in the case of the vehicle 1C shown in FIG. 16, each headlight 41 may include a plurality of second front lights 52. In this case, the plurality of second front lights 52 may be aligned in the left and right direction. The first front light 51 may be disposed around one second front light 52 as shown in FIG. 16, or may be disposed across the peripheries of the plurality of second front lights 52. Each headlight 41 may include a plurality of first front lights 51. In this case, the plurality of first front lights 51 are preferably located in line.

The respective numbers of the front wheels 4 and the rear wheels 7 are not limited to two described above, and may be three or more, or one. The rear wheels 7 may not be tires but may include continuous tracks such as crawlers.

The positional relationship between the first front lights 51 and the second front lights 52, and the positional relationships between these front lights and other components such as the display 40, are changeable as necessary.

Also, features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
a vehicle body frame;
a front wheel supported by the vehicle body frame;
a handle located farther rearward than a rotation axis of the front wheel, and that is operated by an occupant to turn the front wheel;
a pair of left and right first front lights extending linearly in a left-right direction, having an elongated slit shape, and being located farther rearward than a front end of the front wheel and farther forward than the handle; and
a pair of left and right second front lights provided separately from the first front lights; wherein
the elongated slit shape of the pair of left and right first front lights is defined by an entire length of the pair of left and right first front lights extending laterally outward and upward and linearly along a single line.

2. The vehicle according to claim 1, wherein a width of an irradiation surface of each of the pair of left and right first front lights is larger than a width of an irradiation surface of each of the pair of left and right second front lights.

3. The vehicle according to claim 1, further comprising:
a front cover that covers at least a portion of a front portion of the vehicle body frame that is located farther forward than the handle; wherein
the front cover is disposed around the pair of left and right first front lights and the pair of left and right second front lights.

4. The vehicle according to claim 3, wherein the front cover has a shape such that the pair of left and right first front lights and the pair of left and right second front lights are exposed forward and laterally outward of the vehicle.

5. The vehicle according to claim 3, wherein the pair of left and right first front lights are located, respectively, along a left edge and a right edge of the front cover.

6. The vehicle according to claim 3, wherein the front cover is made of a resin.

7. The vehicle according to claim 1, wherein
the front wheel includes a left front wheel and a right front wheel;
a pair of left and right front arms respectively supporting the left and right front wheels, and attached to the vehicle body frame in a swingable manner; and
a pair of left and right front shock absorbers located at same locations in a front-rear direction of the vehicle as the pair of left and right first front lights, and that joins the pair of left and right front arms to the vehicle body frame.

8. The vehicle according to claim 1, wherein the vehicle includes a seat that is straddled by the occupant.

9. A vehicle comprising:
a vehicle body frame;
a front wheel supported by the vehicle body frame;
a handle located farther rearward than a rotation axis of the front wheel, and that is operated by an occupant to turn the front wheel;
a pair of left and right first front lights extending linearly in a left-right direction, and located farther rearward than a front end of the front wheel and farther forward than the handle; and
a pair of left and right second front lights provided separately from the first front lights; wherein
the pair of left and right second front lights are located lower than the pair of left and right first front lights; and
the pair of left and right second front lights are located directly below the pair of left and right first front lights in a planar view of the vehicle.

10. A vehicle comprising:

a vehicle body frame;

a front wheel supported by the vehicle body frame;

a handle located farther rearward than a rotation axis of the front wheel, and that is operated by an occupant to turn the front wheel;

a pair of left and right first front lights extending linearly in a left-right direction, and located farther rearward than a front end of the front wheel and farther forward than the handle; and a pair of left and right second front lights provided separately from the first front lights; wherein the pair of left and right first front lights are located farther forward than the pair of left and right second front lights.

11. The vehicle according to claim 10, further comprising a display located farther rearward than the pair of left and right second front lights and that displays information to the occupant.

12. A vehicle comprising:

a vehicle body frame;

a front wheel supported by the vehicle body frame;

a handle located farther rearward than a rotation axis of the front wheel, and that is operated by an occupant to turn the front wheel;

a pair of left and right first front lights extending linearly in a left-right direction, and located farther rearward than a front end of the front wheel and farther forward than the handle;

a pair of left and right second front lights provided separately from the first front lights; and a front cover that covers at least a portion of a front portion of the vehicle body frame that is located farther forward than the handle; wherein the front cover is disposed around the pair of left and right first front lights and the pair of left and right second front lights; and the pair of left and right second front lights are concealed behind the front cover in a planar view of the vehicle.

* * * * *